Dec. 1, 1959 D. A. WILLIAMS, JR 2,915,650

RAMP WAVE GENERATOR

Filed Sept. 11, 1957

INVENTOR.
D. A. WILLIAMS, JR.
BY
ATTORNEY

United States Patent Office 2,915,650

Patented Dec. 1, 1959

2,915,650

RAMP WAVE GENERATOR

Don A. Williams, Jr., North Hollywood, Calif., assignor to Bendix Aviation Corporation, North Hollywood, Calif., a corporation of Delaware Application September 11, 1957, Serial No. 683,308

10 Claims. (Cl. 307—88.5)

This invention relates to circuits for generating rising potential waves commonly referred to as ramp or saw-tooth waves.

It is well known to develop ramp waves by charging a capacitor with a constant current, under which conditions the potential across the capacitor rises linearly with time. Difficulties are encountered in designing simple circuits providing:

(1) a constant charging current, and (2) a rapid recovery of the circuit to prepare it for generation of the next ramp wave.

An object of the invention is to provide simple ramp wave generating circuits having exceptionally good linearity, and rapid recovery.

Another object is to provide a ramp wave generating circuit that can utilize transistors as amplifying elements instead of vacuum tubes.

Other more specific objects and features of the invention will appear from the following description:

In a conventional type of ramp wave generator, a capacitor is charged from a D.C. source through a resistor, the rising potential across the capacitor constituting the ramp wave. Such a wave tends to rise exponentially rather than linearly, because the potential drop across the resistor, and hence the charging current, diminishes as the capacitor charges. This defect has been reduced by the use of "boot strap" circuits which respond to the rising potential at the lower end of the resistor to correspondingly lift the potential at the upper end. A commonly used boot strap circuit comprises a cathode follower amplifier having its grid (input) connected to the lower end of the resistor and its cathode (output) connected through a large feedback condenser to the upper end of the resistor, with a diode (rectifier) interposed between the upper end of the resistor and the current source to enable the potential at the upper end of the resistor to rise above the potential of the current source. Each ramp wave is terminated and the circuit restored to normal by closing a switch connected across the capacitor to discharge the latter. The resultant decreased potential on the grid of the cathode follower renders the latter nonconducting, and the feedback condenser recharges through the conventional load resistor in the cathode circuit.

It is obvious to simply substitute a transistor emitter follower for the vacuum tube cathode follower of the conventional circuit described, but the resultant ramp wave is less linear, because a transistor draws input current, whereas the vacuum tube does not. This deficiency of transistors could be mitigated by increasing the resistance of the emitter load resistor of the emitter follower to a large value, but that is impracticable because the time required for recharge of the feedback condenser would be increased.

In accordance with one phase of the present invention, the problem is solved by eliminating the conventional load resistor of the emitter-follower (the transistor equivalent of a cathode follower) and inserting the recycling switch in place of it. The results are that:

(*a*) The emitter load resistance approaches infinity, the entire emitter current is fed to the feedback condenser, the voltage gain is substantially unity, and the generated ramp wave is exceptionally linear, and the linearity is independent of the transistor current gain characteristic;

(*b*) The capacitor feedback condenser is recharged rapidly through a low resistance circuit upon closure of the recycling switch; and (*c*) The ramp condenser is discharged through the transistor upon closure of the recycling switch.

In one circuit that may be employed, the transistor-collector is energized through a current-limiting resistor which produces a square voltage wave during the ramp period, which square wave holds the restoring switch after the latter is triggered by a pulse, thereby providing self-gating properties.

A variation of the circuit is possible, in which the ramp resistor is in the input circuit of the emitter-follower, and the ramp condenser is in the output circuit and absorbs all the output current. This has the advantages of requiring a relatively small feedback capacitor to supply the small ramp resistor current, and of providing a low resistance recovery circuit separate from the transistor so that the surge of current during discharge does not flow through the transistor.

A full understanding of the invention may be had from the following detailed description taken in connection with the accompanying drawing in which.

Figures 1, 2:
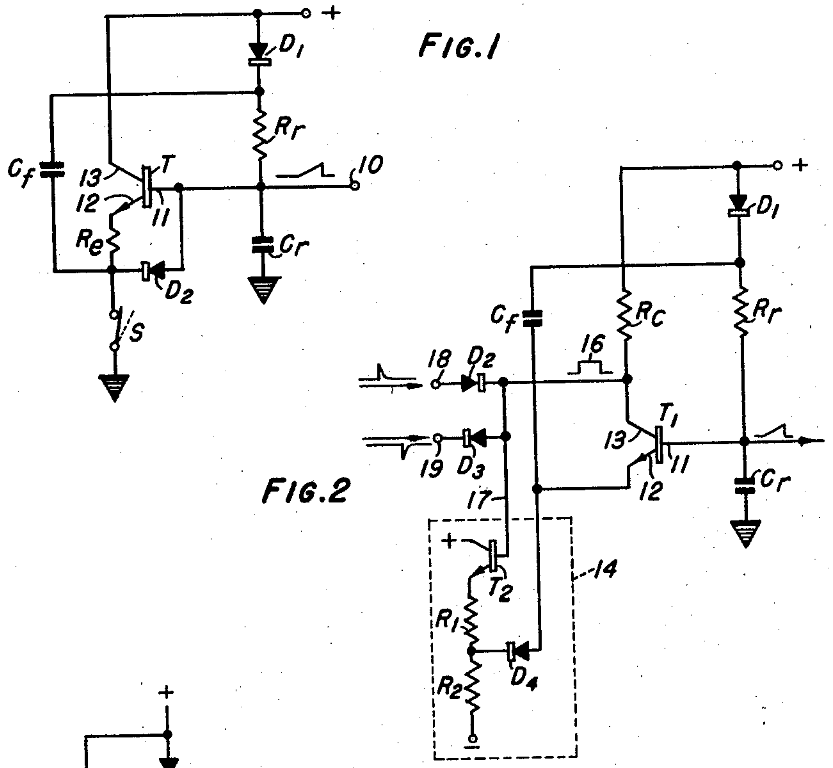
Fig. 1 is a schematic circuit of a simple ramp generator in accordance with the invention.
Fig. 2 is a schematic circuit of a modified form of the generator shown in Fig. 1 in conjunction with an electronic switch for controlling it.

Referring to Fig. 1, a diode $D_1$, a ramp resistor $R_r$, and ramp condenser $C_r$ are connected in series between a positive source of potential and ground. Except during the generation of a ramp wave, the capacitor $C_r$ is short-circuited through a diode $D_2$ and a switch S to ground, so that the ramp condenser $C_r$ is discharged. Under such conditions, the potential on an output terminal 10 connected to the juncture of the resistor $R_r$ and the capacitor $C_r$ is constant. When the switch S is opened, the path to ground for current flowing through the resistor $R_r$ is interrupted, and the current flows into the ramp condenser $C_r$ and develops a rising potential on the output terminal 10. Without means for correction, this rising potential would be exponential, rather than linear, because the current flowing through the resistor $R_r$ would decrease as the condenser $C_r$ is charged.

To maintain constant current through the resistors $R_r$ and into the capacitor $C_r$ during generation of a ramp wave, a feedback circuit is provided for raising the potential at the upper end of the ramp resistor $R_r$ at the same rate of rise as that of the potential at the lower end of the resistor, so that the potential drop across, and the current in, the resistor remains constant, thereby producing a linear ramp potential on the output terminal 10. This feedback circuit comprises a transistor T and feedback capacitor $C_f$ connected to feed current to the upper end of the ramp resistor $R_r$ at a constant rate, whereby the potential at the upper end of the resistor rises in unison with the potential rise on the capacitor $C_r$. The potential of the upper end of the resistor $R_r$ is enabled to rise above the potential of the D.C. source by virtue of the diode $D_1$ in the supply line to the upper end of the resistor $R_r$.

The transistor T has its base electrode 11 connected directly to the output terminal 10, its emitter electrode 12 connected through a small resistor $R_e$ to the juncture between the diode $D_2$ and the switch S, and through the feedback capacitor $C_f$ to the upper end of the resistor $R_r$. The collector electrode 13 of the transistor T may be connected to any suitable source of potential and is shown connected to the same source that feeds the ramp resistor $R_r$.

With the connection shown and described, the base electrode 11 of the transistor T is the input terminal, and the emitter electrode 12 is the output terminal. When the base electrode 11 is positive with respect to the emitter electrode 12, a current flows from the base to the emitter and causes the flow of a much larger current from the collector electrode 13 to the emitter electrode 12. The ratio between the base current and the emitter current is constant, and is determined by the current amplification index of the transistor.

As previously described, when the switch S is closed, there is a low resistance path to ground from the output terminal 10 through diode $D_2$, and the condenser $C_r$ is substantially discharged. There is also a small flow of current through the transistor from the base 11 to the emitter 12 and from the collector 13 to the emitter 12, but such currents are of insufficient magnitude to injure the transistor. The small resistor $R_e$ is for the purpose of further limiting the emitter current during discharge, but it is not essential.

The generation of the ramp wave is initiated by opening the switch S. The potential between the base electrode 11 and the lower end of $R_e$ thereupon drops to a value below which the diode $D_2$ does not conduct. There being no path to ground through the transistor T, the potential on the terminal 10 begins to rise as the ramp condenser $C_r$ charges, and the rising potential is applied to the base 11. Current now flows from the positive source through the collector electrode 13 to the emitter electrode 12, through the feedback condenser $C_f$ to the upper end of the resistor $R_r$ at such a rate as to maintain the potential drop between the base electrode 11 and the emitter electrode 12 substantially constant, which causes the potential of the emitter electrode 12 to follow the potential of the output electrode 10. The feedback condenser $C_f$ is of large capaciy so that the potential thereacross remains substantially constant throughout the ramp cycle. Since the potential at the upper end of the resistor $R_r$ follows the potential of the lower end, the potential across $R_r$ is constant, the current is constant, and the ramp potential on the output terminal 10 rises at a substantially linear rate. This linearity results largely from the fact that there is no load resistor connected between the emitter electrode 12 and ground, so that the entire emitter current is delivered to the feedback capacitor $C_f$.

When it is desired to terminate the rise of the ramp wave, the switch S is reclosed, which completes a direct path from the feedback capacitor $C_f$ to ground to recharge the feedback condenser and complete the path through the diode $D_2$ from the output terminal 10 to discharge the ramp capacitor $C_r$.

The circuit of Fig. 2 differs essentially from that of Fig. 1 in that:

(1) The diode $D_2$ is eliminated;

(2) A current-limiting resistor $R_c$ is connected between the collector electrode 13 of the transistor $T_1$ and the positive source;

(3) The switch is an electronic switch 14; and (4) Triggering circuits for the electronic switch are provided.

The resistor $R_c$ is of relatively low value, so that it produces very little potential drop during normal operation of the transistor $T_1$, but produces a large potential drop when the switch 14 is closed, to limit the potential on the collector electrode 13. The base and emitter electrodes 11 and 12 of the transistor then function substantially as a diode to discharge the ramp capacitor $C_r$ when switch 14 is closed. Following discharge of the capacitor $C_r$, the steady state current through $R_r$ flows through the base and emitter of the transistor $T_1$, causing a large collector current and a large potential drop in the resistor $R_c$ until the switch 14 is next opened. The opening of the switch immediately reduces the emitter and base currents to much lower values, and most of the steady state current through the resistor $R_r$ then flows into the ramp capacitor $C_r$ to generate the ramp potential. As a result of the foregoing, the potential on the collector is at a low value during closure of the switch 14, rises to a high value while the switch 14 is open, and again drops to the low value on reclosure of the switch, to produce a square wave, as indicated at 16.

The square wave 16 can be used as a gating device to enable the start of the ramp in response to a pulse of one polarity, and the termination of the ramp in response to a pulse of opposite polarity applied to the collector electrode 13 over the conductor 17 which is the control conductor of the electronic switch 14. Thus, an input terminal 18 is shown connected to the conductor 17 by a diode $D_2$ poled to pass positive pulses, and a second input terminal 19 is shown connected to the conductor 17 by a diode $D_3$ poled to pass negative pulses.

As previously described, when the switch 14 is closed, current flows through the ramp resistor $R_r$ to the base 11, and from the emitter electrode 12 to ground, a low resistance path is provided through the transistor $T_1$ from the collector electrode 13 to the emitter electrode 12, and the potential on the conductor 17 is low by virtue of the potential drop in the resistor $R_c$.

A positive pulse applied to the terminal 18 is passed by the diode $D_2$ to the conductor 17 and to the electronic switch 14, causing the latter to tend to open. This reduces the current flowing from the collector 13 to the emitter 12, causing the potential on the conductor 17 to rise. This rise continues to the point where the switch 14 is open, whereupon the generation of a ramp wave begins, which is accompanied by the square wave 16 on the collector electrode. The generation of the ramp wave continues until a negative pulse is applied to the terminal 19 and through the diode $D_3$ to the conductor 17. This reduces the resistance of the switch 14, increasing the current flow to the collector 13 and reducing the potential thereof by virtue of the resistor $R_c$. The effect is cumulative to rapidly reduce the potential on 17 to its normal value, at which the electronic switch 14 has a low resistance, so that the ramp potential on the output terminal rapidly drops to the starting value.

Various forms of electronic switches may be employed as the switch 14. A simple one employing a transistor $T_2$ is shown in Fig. 2. The transistor $T_2$ has its base connected to the conductor 17, its collector connected to a source of positive potential (which may be the same source that is used to energize the resistance-capacitance circuit) and an emitter connected through a pair of voltage-dividing resistors $R_1$ and $R_2$ to a source of negative potential. The junction of resistors $R_1$ and $R_2$ is connected through a diode $D_4$ to the emitter electrode 12 of transistor $T_1$.

Normally, the potential on conductor 17 is low, and the emitter current to resistors $R_1$ and $R_2$ is very small, so that the potential of the junction between the resistors is at a low value. Under such conditions, the diode $D_4$ offers a low resistance path between ground and the emitter 12 of the transistor $T_1$. However, when the potential on conductor 17 is high (by the application thereto of the square wave 16), the potential of the junction between resistors $R_1$ and $R_2$ is more positive than the potential on the emitter 12 of the transistor $T_1$, and the current output of the emitter 12 can flow only to the feedback condenser $C_f$.

Figure 3:
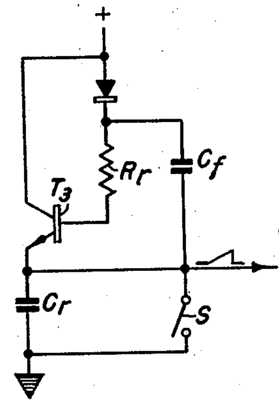
Fig. 3 is a schematic circuit of still another form of the invention.

The circuit of Fig. 3 differs from those of Figs. 1 and 2 in that the ramp resistor $R_r$ is connected to the base of a transistor $T_3$, and the ramp capacitor $C_r$ is connected between the emitter of the transistor $T_3$ and ground. A great advantage of this circuit is that since the ramp resistor $R_r$ does not have to carry the charging current for the capacitor $C_r$, resistor $R_r$ can be relatively large so that the current flow through it is relatively small, and the feedback condenser $C_f$ in Fig. 3 can, as a result, be much smaller than the feedback condensers in Figs. 1 and 2, without appreciable voltage change across it during the ramp cycle. The ramp output is linear, because the emitter current into the feedback capacitor $C_f$ is a constant function of the current through the ramp resistor $R_r$. The circuit also has the advantage that the ramp capacitor $C_r$ is discharged, and the feedback capacitor $C_f$ is charged directly through the switch S.

P-N-P transistors and a negative voltage source can be used in place of the N-P-N transistors and positive voltage source, to produce a negative-going ramp wave.

The circuit of Fig. 2 has the advantage of being inherently self-gating so that it is responsive to start and stop pulses without the use of additional flip-flop circuits. All three circuits have the advantages of high linearity and a high variable duty cycle without depending on a high transistor current gain. By test, ramp potentials rising 5 volts in a period of 700 microseconds were obtained that were linear within 0.06%.

It is to be understood that although simple mechanical switches have been shown in Figs. 1 and 3, this is only for convenience of disclosure, and in practice, some form of electronic switching device would almost invariably be used.

Although for the purpose of explaining the invention a particular embodiment thereof has been shown and described, obvious modifications will occur to a person skilled in the art, and I do not desire to be limited to the exact details shown and described.

I claim:

1. A ramp wave generator comprising: a source of direct current having first and second terminals; a diode, a resistor, and a capacitor, and means connecting them in series between said first and second terminals in the order named; an amplifier having input and output terminals and responsive to potential increase on its input terminal relative to its output terminal to deliver a large current from said output terminal; means connecting said amplifier input terminal to the junction of said resistor and capacitor; a feedback capacitor connected between said amplifier output terminal and the junction of said diode and resistor; and means including a selectively operable switch connecting said amplifier output terminal to said second source terminal and constituting the sole direct current path therebetween; whereby said feedback capacitor is charged from said source when said switch is closed, and said feedback capacitor constitutes the sole path for current from said amplifier output terminal when said switch is open.

2. Apparatus according to claim 1 in which said amplifier is of the cathode follower type in which the output terminal potential follows but cannot exceed the input terminal potential.

3. Apparatus according to claim 2 in which said amplifier comprises a transistor having a base constituting the input terminal, an emitter constituting the output terminal, and a collector, and means for applying a potential to said collector.

4. Apparatus according to claim 3 in which the connection between said collector and said potential source comprises a current-limiting impedance element for reducing the collector potential to a very low value during closure of said switch, whereby said first condenser discharges through said base, emitter, and switch without producing an overload current through said collector.

5. Apparatus according to claim 4 including switch-actuating means connected to said collector and responsive to the potential drop across said current-limiting impedance element to hold said switch open only during said ramp-generating period.

6. Apparatus according to claim 5 including pulse-responsive means for triggering said switch open and closed.

7. Apparatus according to claim 1 including rectifying means connecting said input and output terminals of said amplifier for discharging said first capacitor in response to closure of said switch.

8. Apparatus according to claim 3 including rectifying means connecting said base and emitter electrodes for bypassing discharge current of said first capacitor past said transistor during closure of said switch.

9. A ramp wave generator comprising: a source of direct current having first and second terminals; a current amplifier having input and output terminals and responsive to potential between its input and output terminals to receive on its input terminal an input current proportional to said potential and deliver to its output terminal an output current proportional to but greater than said input current; a diode and a resistor and means connecting them in series between said first source terminal and said input terminal of said amplifier; a first capacitor and means connecting it between said amplifier output terminal and said second source terminal; a feedback capacitor connected between the junction of said diode and resistor and the junction of said amplifier output terminal and said first capacitor; and a selectively operable switch connected in shunt to said first capacitor.

10. Apparatus according to claim 7 in which said amplifier comprises a transistor having a base constituting the input terminal, an emitter constituting the output terminal, and a collector, and means connecting the collector to said first terminal of said source.

References Cited in the file of this patent

UNITED STATES PATENTS

| | | |
|---|---|---|
| 2,562,188 | Hance | July 31, 1951 |
| 2,688,075 | Palmer | Aug. 31, 1954 |
| 2,727,144 | Leyde et al. | Dec. 13, 1955 |